Sept. 7, 1965
L. SCHWAB
3,204,391
AIR FILTRATION
Filed Dec. 28, 1962
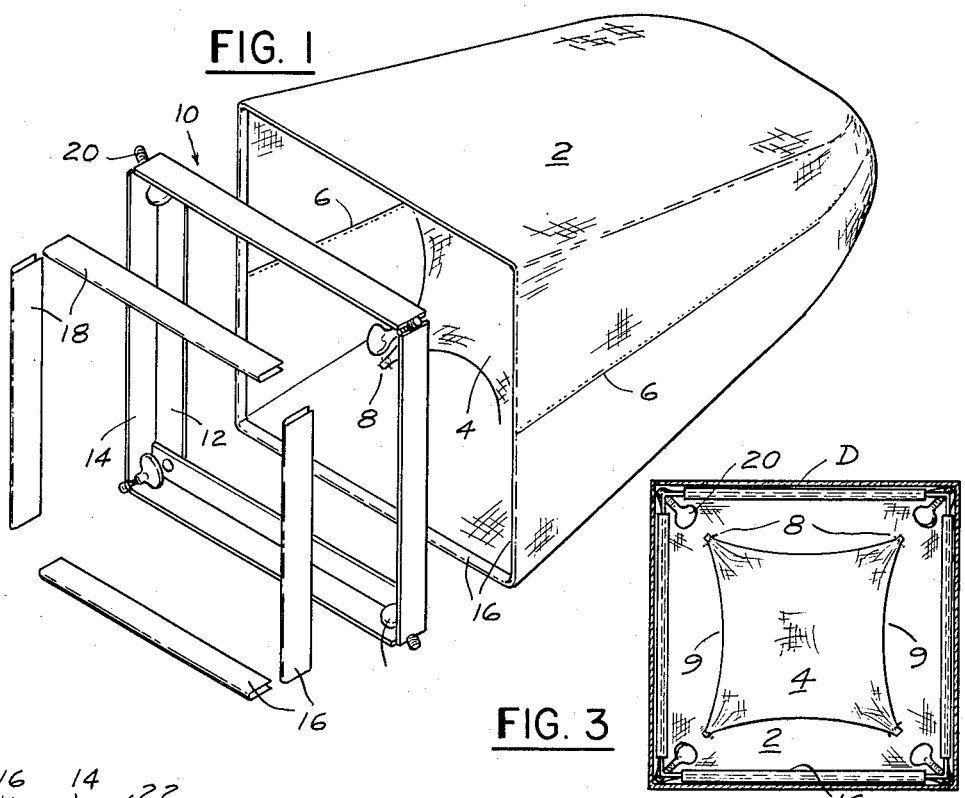
FIG. 1
FIG. 3
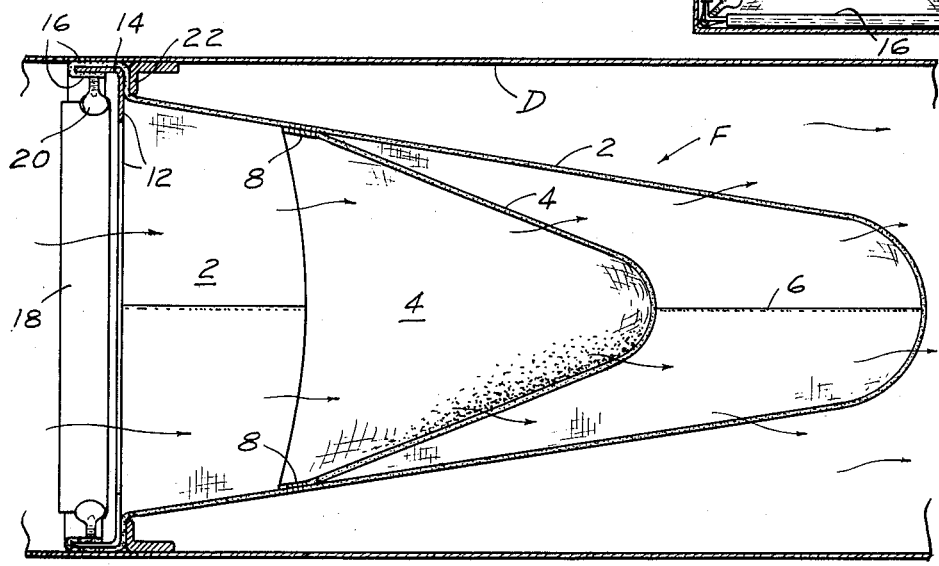
FIG. 2
INVENTOR.
LOUIS SCHWAB
BY Hane + N'ydick
ATTORNEYS

United States Patent Office 3,204,391
AIR FILTRATION
Louis Schwab, P.O. Box 5146, Orlando, Fla.
Filed Dec. 28, 1962, Ser. No. 248,139
5 Claims. (Cl. 55—374)

This invention relates to the filtration of dust and other particles suspended in gases, and more particularly to the filters generally used in the air ducts of circulating air systems.

In the maintenance of circulating air systems for heating, cooling and ventilating, with regard to the replaceable filter units used in some such systems a major consideration favoring one filter construction over another is the effective life of the filter; that is the length of service time after which replacement or cleaning of a filter unit is called for because it imposes too great a flow resistance and/or no longer effectively stops impurities in the stream. An ordinary filter of this type is composed of a fibrous barrier having interstices designed to impede the passage of a wide variety of atmospheric dust particles, many of which are in the less than five micron size range. Depending upon whether the filter tends more toward a pure sieve principle or an impingement-reaction principle, the interstices may variably be larger or smaller than the entrained particles. Regardless of the principle involved, it is well understood that the particle arrestance of the filter increases as it becomes clogged, but with concomitant sharply increasing rise in flow resistance. Eventually, however, dust will accumulate to the point where, due to a large pressure differential, dust particles possibly will be driven through the barrier. It is a combination of these factors of flow resistance and particle arrestance that determines the filter service life.

A further consideration is that the design velocity through the filter medium is typically in the range of 10 to 50 feet per minute depending, of course, on the particular medium. This naturally imposes other design limitations. In order to avoid undue enlargement of a duct (which would effect a reduction in velocity) filters commonly are corrugated, pleated or otherwise angularly disposed relative to the air stream to provide greater effective filtering area. One form of filter that has been proposed to provide large filter area, and which has proved highly suitable in terms of cost, convenience and effectiveness, has been a filter having a roughly pyramidal, conical or wedge-shaped type of tapered configuration.

The present invention constitutes an improvement in the last-mentioned type of filter unit, and is consistent with the generally universal objects in the art reflected in the above introductory discussion. The invention takes advantage of the fact that in a filter having such a tapered configuration the dust tends to travel toward and accumulate at the apex portion thereof.

This filter, constructed according to the present invention, embodies a novel construction wherein an outer tapered filter body is of a substantially uniform lower permeability, and a filter body of relatively greater permeability, i.e., a pre-filter, is inserted within the outer body in the path of the major portion of the air stream and the particles, being positioned across only the portion occupying the mainly central stream. The upstream peripheral edges of the pre-filter are so shaped with respect to the inner wall of outer tapered filter body to provide lateral air stream by-passes between the pre-filter and the outer filter body. The space between this insert and the downstream bottom or apex portion of the outer filter body acts as a cavity for the accumulation of trapped dust particles. The pre-filtration may be provided by a plurality of pre-filters arranged in tandem. It has been determined that a filter thus constructed will have more favorable flow resistance characteristics, thereby permitting greater rate of flow, and longer service life than previously known filters designed for the same commercial applications.

Further objects, advantages and details of this invention will become evident from the following description of a preferred embodiment of the invention, in which:

FIGURE 1 is a perspective view of the filter and the frame parts (shown disassembled) for mounting of the filter in the duct;

FIGURE 2 is a longitudinal sectional view of a duct having therein the novel filter according to the invention, but also illustrating the pattern of flow through the filter; and FIGURE 3 is a cross-section of the duct, taken upstream of the filter and providing a view of the open end thereof.

Filters constructed in accordance with the present invention are intended for use mainly in ducts of heating, cooling and ventilating systems. In such systems, filters typically are removably installed at the inlets or outlets of horizontal ducts, though it will be understood that other arrangements of these filters can be used. In the accompanying drawings a filter is generally indicated at F, and is illustrated in its application to a horizontal duct D having a substantially square cross-section.

Filter F basically comprises outer and inner filter bodies which are essentially shaped as bags and will be referred to as such hereafter, the outer and inner bags being designated 2 and 4, respectively. It will be realized, however, that these parts are not to be limited as being bag-like in the usual sense, in that they may be flexible, semi-rigid or rigid, depending on the particular filter materials employed in their making. The halves of the outer bag 2 are joined by sewing or other means at locations 6. Although the inner bag (the pre-filter) 4 is shown as being similarly united with the outer bag 2, as by sewing, at locations 8, the pre-filter may be detachably mounted therein, as by complementary hook and eye, or snap fastener, arrangements between 4 and 2, or any other suitable means. This allows for further economies, in that such a mode of affixation allows for removal and replacement of the pre-filter alone.

It is important to note that in the making of this filter, each of the bags 2 and 4 is given a shape providing diminishing cross-sectional area in progression in the downstream direction. The bags 2 and 4 may have a tapered or convergent shape as defined in one or more planes cutting lengthwise through the duct. That is, the bags may be generally conical, wedge-shaped, pyramidal, or modified forms thereof, such as frusto-conical. The peripheral edges of the pre-filter on the upstream side, are shaped with respect to the inner wall of 4, to provide lateral air stream by-passes as at 9 between the pre-filter 4 and the outer filter body 2. This by-passing is of advantage in case the pre-filter loads up, so as to relieve excessive pressure on the pre-filter. As has been previously mentioned, the pre-filtration may be provided by a plurality of pre-filters akin to pre-filter 4, suitably disposed in tandem within filter body 2.

The means for securing the filter F in a duct comprises a frame 10 shaped to conform to the cross-section of the duct and constructed of right angle stock having legs 12 and 14. The peripheral edge 16 of the filter at its open base portion is folded inwardly in U-shaped fashion, being thereby specially adapted to receive the leg 14 at the sides of the frame as shown in FIGURE 2. When the peripheral filter edge 16 has been thus wrapped, in effect, around the frame it is secured by retaining clips 18 each having an appropriately dimensioned U-shaped cross-section. The frame 10 and clips 18 may be formed of any fairly rigid material such as metal, plastic or pressed fiberboard. The complete assembly comprising filter F, frame 10 and clips 18 is fastened in place within a duct D by means of thumb screws 20 threaded in the corners of frame 10. If desired, the duct D can be provided with a flange 22 constituting an abutment to limit downstream movement of the filter unit within the duct. The flange 22 also serves as a further means for clamping the filter material in frame 10.

The porous materials from which filter F is formed may include shaped fabrics treated, if desired, to improve rigidity and/or particle arrestance qualities. Additionally, a filter material may include natural or synthetic fibers applied to or otherwise incorporated with the fabric backing. Examples of usable fibers are cotton, hair, glass, nylon, rayon and some acrylic compositions.

In making the filter F, instead of using a single filter material having a given permeability factor, according to the invention the outer bag 2 has a finer, closer texture than the inner bag 4. That is, the interstices in the meshed construction of the material forming the insert or inner bag 4 provides greater permeability to fluids than the interstices of the material forming outer bag 2.

It has been determined that in service a filter constructed in accordance with this invention should have a life, prior to cleaning or replacement, which is considerably longer than the life of an ordinary filter having approximately the same surface area. Also, this filter is characterized by more favorable flow resistance characteristics, thereby permitting greater flow rates. Because of the more permeable nature of the inner bag 4 at the mainly central air stream location, where dust tends to be collected, the inner bag stops only the larger entrained particles and the finer particles permeate it to be stopped downstream by the less permeable outer bag 2. As dust accumulates on the inner bag 4, its particle arrestance capability tends, of course, to increase. However, because finer particles pass through to the inner bag 2, the filter 4 becomes clogged at a favorably slow rate. Eventually, inner bag 4 becomes fully clogged and the filtering function is assumed to a greater extent by the less permeable upstream portions of outer bag 2 until the filter unit is cleaned or replaced either in its entirety, or, when pre-filter 4 is detachably mounted, as mentioned above, by the cleaning or replacement thereof while 2 remains in its mounted position.

It will be understood that various departures from the specifically disclosed embodiment of the invention can be made without departing from the scope thereof as defined by the following claims:

I claim:
1. A filter for use in separating entrained particles carried by an air stream comprising:
  (1) a hollow outer member constituted of air permeable filtering material and having an upstream open end and a downstream closed end, said member having wall portions uniformly tapering from said upstream end to said downstream end,
  (2) an inner hollow prefilter member constituted of filtering material of greater permeability than that of said outer member, said inner member being centrally disposed in said outer member in the path of the major portion of the air stream and having an upstream open end and a downstream closed end, said inner member having wall portions tapering uniformly from said upstream end to said downstream end, the upstream end of the inner member being disposed downstream from the upstream open end of the outer member, and the downstream end of the inner member being disposed upstream from the downstream end of the outer member, and
  (3) means securing the peripheral edges of the open end of the inner member to the outer member at a plurality of circumferentially spaced apart points, the remaining portions of the said peripheral edges being spaced from the inner surface of the outer member, said spacing thereby allowing a peripheral portion of the air stream to bypass the inner member.

2. A filter in accordance with claim 1 wherein the prefilter is detachably mounted within the outer member.

3. A filter in accordance with claim 1 wherein the prefilter is fixedly mounted within the outer member.

4. In combination: a duct for circulation of an air stream, and a filter for use in separating entrained particles carried by said air stream comprising:
  (1) a hollow outer member constituted of air permeable filtering material and having an upstream open end and a downstream closed end, said member having wall portions uniformly tapering from said upstream end to said downstream end,
  (2) an inner hollow prefilter member constituted of filtering material of greater permeability than that of said outer member, said inner member being centrally disposed in said outer member in the path of the major portion of the air stream and having an upstream open end and a downstream closed end, said inner member having wall portions tapering uniformly from said upstream end to said downstream end, the upstream end of the inner member being disposed downstream from the upstream open end of the outer member, and the downstream end of the inner member being disposed upstream from the downstream end of the outer member, and
  (3) means securing the peripheral edges of the open end of the inner member to the outer member at a plurality of circumferentially spaced apart points, the remaining portions of the said peripheral edges being spaced from the inner surface of the outer member, said spacing thereby allowing a peripheral portion of the air stream to bypass the inner member, the wall portions of the filter at the open upstream end of the outer member being secured to the inner wall of the duct whereby all of the air stream which enters the duct passes through the filter.

5. The combination in accordance with claim 4 which includes a frame to which the wall portions of the open upstream end of the outer member are attached, said frame serving to secure the filter in the duct.

References Cited by the Examiner

UNITED STATES PATENTS

| | | | |
|---|---|---|---|
| 1,363,753 | 12/20 | Quinn | 55—380 |
| 1,827,496 | 10/31 | Vanderwilt | 55—366 |
| 1,842,294 | 1/32 | Schrader | 55—378 XR |
| 2,007,518 | 7/35 | Calhoun | 55—366 |
| 2,272,394 | 2/42 | Armstrong | 55—371 X |
| 2,327,225 | 8/43 | Taymor | 55—380 XR |
| 2,732,911 | 1/56 | Gall | 55—371 X |
| 2,804,166 | 8/57 | Stevens et al. | 55—367 |
| 2,833,372 | 5/58 | Lappin et al. | 55—376 |
| 2,964,127 | 12/60 | Korn | 55—379 |

FOREIGN PATENTS

| | | |
|---|---|---|
| 701,447 | 1/31 | France. |
| 395,814 | 7/33 | Great Britain. |

ROBERT F. BURNETT, *Primary Examiner.*

HARRY B. THORNTON, *Examiner.*